(12) United States Patent
Sakaguchi et al.

(10) Patent No.: US 11,529,865 B2
(45) Date of Patent: Dec. 20, 2022

(54) ENGINE COOLING STRUCTURE FOR MOTORCYCLE

(71) Applicant: Kawasaki Motors, Ltd., Hyogo (JP)

(72) Inventors: Shogo Sakaguchi, Akashi (JP); Takahiro Jyouzaki, Akashi (JP)

(73) Assignee: KAWASAKI MOTORS, LTD.

( * ) Notice: Subject to any disclaimer, the term of this patent is extended or adjusted under 35 U.S.C. 154(b) by 370 days.

(21) Appl. No.: 16/684,393

(22) Filed: Nov. 14, 2019

(65) Prior Publication Data

US 2020/0207202 A1 Jul. 2, 2020

(30) Foreign Application Priority Data

Dec. 26, 2018 (JP) .............................. JP2018-242098

(51) Int. Cl.
| | |
|---|---|
| *B60K 11/00* | (2006.01) |
| *B60K 11/06* | (2006.01) |
| *F01P 1/02* | (2006.01) |
| *B60K 11/08* | (2006.01) |
| *B62J 15/00* | (2006.01) |
| *B62K 11/04* | (2006.01) |

(52) U.S. Cl.
CPC .............. *B60K 11/06* (2013.01); *B60K 11/08* (2013.01); *B62J 15/00* (2013.01); *F01P 1/02* (2013.01); *B62K 11/04* (2013.01); *F01P 2001/023* (2013.01); *F01P 2001/026* (2013.01); *F01P 2050/16* (2013.01)

(58) Field of Classification Search
CPC . B62K 11/00; F01P 2001/026; F01P 2050/16; F01P 1/02
See application file for complete search history.

(56) References Cited

U.S. PATENT DOCUMENTS

| | | | | |
|---|---|---|---|---|
| 4,546,843 | A * | 10/1985 | Koinuma ................. | B62J 50/30 55/385.3 |
| 7,325,639 | B2 | 2/2008 | Yamaguchi et al. | |
| 2005/0092283 | A1* | 5/2005 | Eguchi .................. | F02B 77/089 60/323 |
| 2006/0000652 | A1 | 1/2006 | Yamaguchi et al. | |
| 2009/0166120 | A1* | 7/2009 | Okamoto ................. | B62J 15/00 280/847 |
| 2013/0168039 | A1* | 7/2013 | Arai ......................... | B62M 7/02 165/41 |
| 2013/0214553 | A1* | 8/2013 | Tsukui ..................... | B62J 17/06 296/78.1 |
| 2013/0306391 | A1* | 11/2013 | Kontani ................. | B62K 11/00 180/219 |

(Continued)

FOREIGN PATENT DOCUMENTS

| | | |
|---|---|---|
| JP | 2006-015930 | 1/2006 |
| JP | 4244178 B | 1/2016 |

*Primary Examiner* — Long T Tran

(57) ABSTRACT

A front fender is provided in front of an air-cooled engine which is a drive source of a motorcycle. An air introduction hole which opens frontward is formed at a front part of a cylinder head of the air-cooled engine. A space around a plug attachment portion for a spark plug and a space in front of the cylinder head communicate with each other through the air introduction hole. A guide portion for guiding incoming wind toward the air introduction hole is formed at a rear part of the front fender.

9 Claims, 7 Drawing Sheets

(56) References Cited

U.S. PATENT DOCUMENTS

| | | | |
|---|---|---|---|
| 2016/0090152 A1* | 3/2016 | Sasaki | B62K 11/04 |
| | | | 180/229 |
| 2016/0144921 A1* | 5/2016 | Oshima | B62J 15/00 |
| | | | 180/219 |
| 2016/0264199 A1* | 9/2016 | Wakita | B62J 15/00 |
| 2019/0202516 A1* | 7/2019 | Yamamoto | B62J 15/00 |

* cited by examiner

ENGINE COOLING STRUCTURE FOR MOTORCYCLE

CROSS REFERENCE TO THE RELATED APPLICATION

This application is based on and claims Convention priority to Japanese patent application No. 2018-242098, filed Dec. 26, 2018, the entire disclosure of which is herein incorporated by reference as a part of this application.

BACKGROUND OF THE INVENTION

Field of the Invention

The present invention relates to an air-cooled engine for a motorcycle.

Description of Related Art

An air-cooled engine for a motorcycle disclosed in Japanese Patent No. 4244178 is provided with an opening at a front surface of a cylinder head. In the air-cooled engine, incoming wind flows through the opening, whereby increase in the temperature of the cylinder head is suppressed.

In such an air-cooled engine, it may be required that increase in the temperature of a cylinder head is further suppressed.

SUMMARY OF THE INVENTION

Considering the above, an object of the present invention is to provide an engine cooling structure that enables further enhancement in the effect of cooling a cylinder head.

In order to solve the above object, an engine cooling structure according to the present invention is employed on a motorcycle including an air-cooled engine, which is a drive source, and a front fender provided in front of the air-cooled engine. In such an engine cooling structure, an air introduction hole is formed at a front part of a cylinder head of the air-cooled engine such that the air introduction hole opens frontward and a space around an attachment portion for a spark plug and a space in front of the cylinder head communicate with each other through the air introduction hole, and a guide portion is formed at the front fender and configured to guide incoming wind toward the air introduction hole.

In this configuration, incoming wind that has reached the front fender is guided toward the air introduction hole by the guide portion of the front fender. Thus, the amount of incoming wind introduced into the air introduction hole can be increased. Therefore, the cooling effect for the cylinder head can be enhanced.

In the present invention, a lower end of a rear portion of the front fender may be located upward relative to a lower end of a cylinder head cover of the air-cooled engine. In this configuration, the rear portion of the front fender and the cylinder head do not overlap each other in a front view, and therefore, the front fender is prevented from blocking the incoming wind flowing toward the cylinder head. In addition, by the incoming wind guided by the guide portion, the incoming wind flowing in a front-rear direction or longitudinal direction of the motorcycle between the lower end of the rear portion of the front fender and the lower end of the cylinder head cover can be also caused to flow toward the front surface of the cylinder head. As a result, the amount of incoming wind flowing toward the cylinder head increases, whereby the cooling effect for the cylinder head can be enhanced.

In the present invention, the front fender may include a fender front portion, a fender rear portion, and a fender intermediate portion located frontward of the fender rear portion and connecting the fender front portion and the fender rear portion, a dimension in a vehicle widthwise direction of the fender front portion may be greater than that of the fender rear portion, and a dimension in a vehicle widthwise direction of the fender intermediate portion may gradually decrease from a front end thereof toward a rear side. In this configuration, a great amount of incoming wind can be collected by the fender front portion having a great width. In addition, the fender intermediate portion of which the dimension in the vehicle widthwise direction gradually decreases toward the rear side can increase the flowing speed of the incoming wind. Further, the incoming wind having the increased flowing speed is guided to the cylinder head by the fender rear portion. Thus, the cooling effect for the cylinder head can be further enhanced.

In the present invention, a shroud may be provided so as to be located frontward relative to the cylinder head, and may cover a part of a motorcycle frame structure from an outer side in a vehicle widthwise direction, and a lower end of a rear portion of the front fender may be located rearward relative to a front edge portion of the shroud. In this configuration, both sides in the vehicle widthwise direction of the lower end portion of the front fender are covered by the shroud. Thus, the incoming wind guided by the front fender is prevented from deviating outward in the vehicle widthwise direction. Therefore, the incoming wind readily flows toward the cylinder head, and thus, the cooling effect for the cylinder head can be further enhanced.

In the present invention, an exhaust pipe may be connected to a front surface of the cylinder head, and the exhaust pipe may include a first part extending so as to be separated in a vehicle widthwise direction from the air introduction hole as advancing frontward from the front surface of the cylinder head. In this configuration, flow of the incoming wind toward the air introduction hole is prevented from being blocked by the exhaust pipe. In addition, also by the incoming wind flowing rearward along the first part of the exhaust pipe, the incoming wind can be introduced into the air introduction hole. Thus, the cooling effect for the cylinder head can be further enhanced.

In this case, the exhaust pipe may extend downward from the first part, and then, at a position below a lower end of a cylinder, bend upward, to extend rearward on one lateral side, with respect to the vehicle widthwise direction, of the cylinder. In this configuration, while the exhaust pipe length is ensured and the exhaust efficiency is maintained at a high level, the incoming wind flowing toward the cylinder is prevented from being blocked by the exhaust pipe. Thus, the cooling effect for the cylinder can be further enhanced.

In the present invention, the cylinder head may have a lateral outlet which opens toward a lateral side in a vehicle widthwise direction from the space around the attachment portion for the spark plug, and a rear outlet which opens rearward from the space around the attachment portion for the spark plug. In this configuration, the incoming wind guided to the area around the spark plug is readily discharged to the outside of the engine through the lateral outlet and the rear outlet, and therefore, the incoming wind flows smoothly. Thus, the cooling effect for the cylinder head can be further enhanced.

In the present invention, at least a part of the air introduction hole may be formed in an area shifted one lateral side in a vehicle widthwise direction with respect to a motorcycle frame structure provided in front of the cylinder head. In this configuration, the incoming wind colliding with the motorcycle frame structure in front of the cylinder head and deviating in the vehicle widthwise direction readily flows toward the air introduction hole. Thus, the cooling effect for the cylinder head can be further enhanced.

Another engine cooling structure according to the present invention is employed on a motorcycle including an air-cooled engine and a front fender provided in front of the air-cooled engine, in which case a guide portion for guiding incoming wind toward a cylinder or a cylinder head is formed at the front fender. In this configuration, incoming wind that has reached the front fender is guided toward the cylinder or the cylinder head by the guide portion of the front fender. Thus, the amount of incoming wind introduced into the cylinder or the cylinder head can be increased. Therefore, the cooling effect for the cylinder or the cylinder head can be enhanced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. As used herein, "right" and "left" refer to "right" and "left" as seen from a driver riding a vehicle.

Figure 1:
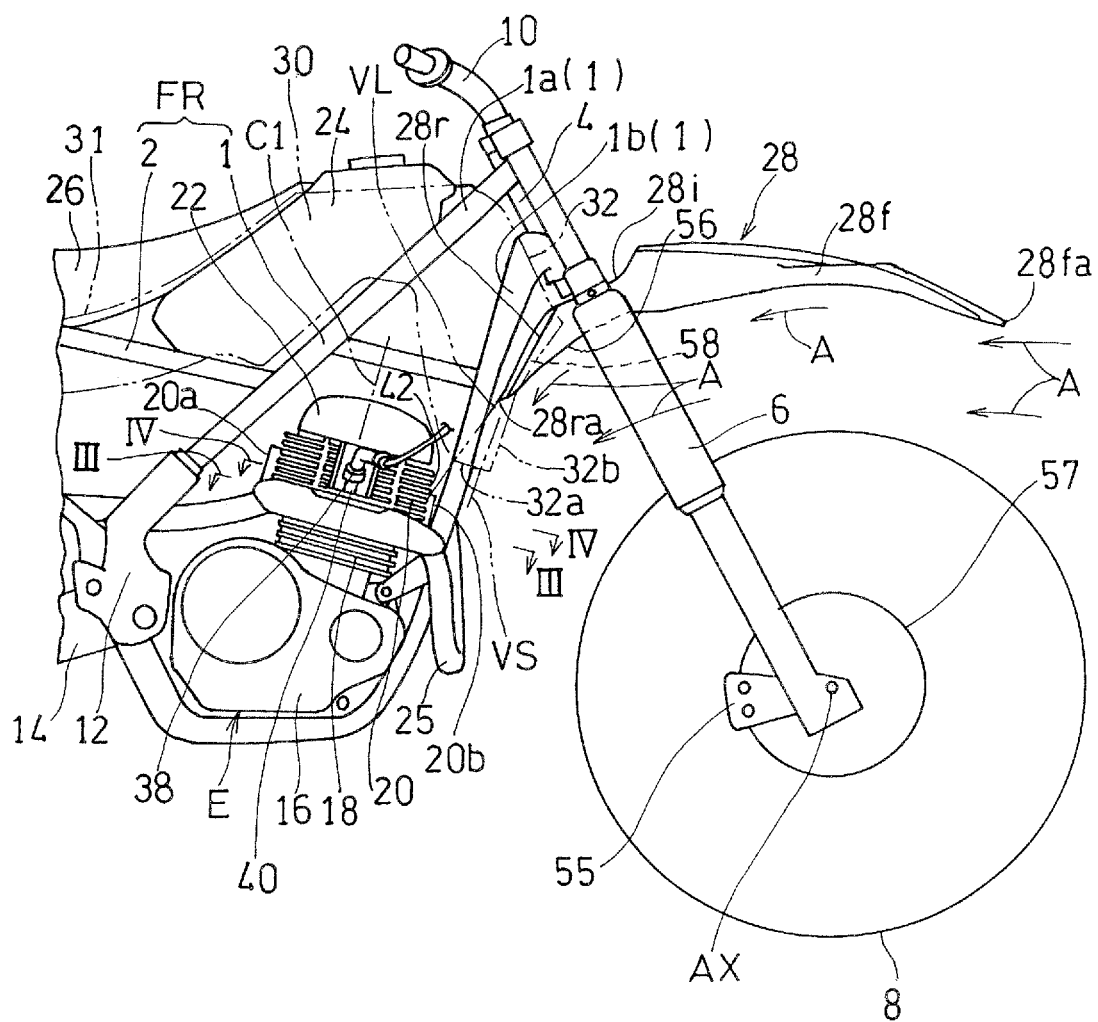
FIG. 1 is a side view showing a front part of a motorcycle having an engine cooling structure according to a first embodiment of the present invention.

FIG. 1 is a side view of a motorcycle having an engine cooling structure according to a first embodiment of the present invention. A motorcycle frame structure FR of the motorcycle in the present embodiment includes a main frame 1 forming a front half part thereof, and a rear frame 2 forming a rear half part thereof. The rear frame 2 is connected to a rear part of the main frame 1.

A front fork 6 is rotatably supported via a steering shaft by a head pipe 4 provided at a front end of the main frame 1. A front wheel 8 is attached to a lower end of the front fork 6. A steering handle 10 is attached to an upper end of the front fork 6.

A swingarm bracket 12 is provided at a rear end of the main frame 1. A front end of a swingarm 14 is supported by the swingarm bracket 12 so as to be able to swing in a vertical direction. A rear wheel is attached to a rear end of the swingarm 14.

An engine E, which is a drive source of the motorcycle, is mounted below the main frame 1 and in front of the swingarm bracket 12. The rear wheel is driven via a power transmission member such as a chain by the engine E.

In the present embodiment, the engine E is a single-cylinder air-cooled engine. However, an engine with two or more cylinders may be used. The engine E includes: a crankcase 16 supporting a crankshaft rotatably; a cylinder 18 protruding upward from the crankcase 16; a cylinder head 20 attached on the upper side of the cylinder 18; and a cylinder head cover 22 provided at an upper part of the cylinder head 20. A cylinder axis C1 of the engine E in the present embodiment extends in a substantially vertical direction. In detail, the cylinder axis C1 is inclined slightly frontward in the upward direction.

The cylinder head 20 has an intake port 20a defined at a rear surface thereof, and an exhaust port 20b defined at a front surface thereof. An intake pipe for supplying air to the engine E is connected to the intake port 20a. An exhaust pipe 25 is connected to the exhaust port 20b. The exhaust pipe 25 extends rearward on the right lateral side (one lateral side in the vehicle widthwise direction) of the cylinder 18 and the cylinder head 20, so as to be connected to a muffler at a rear part of the motorcycle body. The details of the cylinder 18 and the cylinder head 20 will be described later.

A fuel tank 24 is provided at an upper part of the main frame 1, and a seat 26, on which the driver sits, is mounted to the rear frame 2. A front fender 28 is provided in front of the engine E and above the front wheel 8. A part of the front fender 28 is located above and rearward of the front wheel 8. In other words, a rear portion of the front fender 28 is formed substantially in an arc shape along an upper rear portion of the front wheel 8. Thus, the front fender 28 has a dirt shielding function of preventing dirt from flying off toward the driver when dirt is flung up by the front wheel 8.

The front fender 28 is attached to the front fork 6, and is turned right/left together with the front fork 6, i.e., together with the front wheel 8. In the present embodiment, the front fender 28 is located above an extendable part of the front fork 6. That is, via the front fork 6, the front wheel 8 is provided so as to be swingable in the vertical direction with respect to the motorcycle body including the front fender 28.

In the present embodiment, the front fender 28 is formed such that a part rearward thereof relative to the front fork 6 is smaller than a part frontward thereof relative to the front fork 6. Specifically, the distance from the front fork 6 to a fender rear end 28ra is set to be short. More specifically, the distance from the front fork 6 to the fender rear end 28ra is set to be shorter than the distance from the front fork 6 to a fender front end 28fa.

The rear end 28ra of the front fender 28 corresponds to a lower end of the front fender 28. The lower end 28ra of the front fender 28 is located upward relative to the upper end of the front wheel 8. The lower end 28ra of the front fender 28 is located upward relative to the cylinder head 20. In the present embodiment, the lower end 28ra of the front fender 28 is located so as to be spaced upward from the cylinder head cover 22. In other words, in a front view of the motorcycle body, the lower end 28ra of the front fender 28 is located so as to be spaced upward from the engine E.

In the present embodiment, the entirety of the front fender 28 is located so as to be spaced upward from an upper end of the front wheel 8. Thus, incoming wind can pass through the space formed in the vertical direction between the front fender 28 and the front wheel 8. The lower end 28ra of the front fender 28 is located lower than the front end 28fa of the front fender 28. Specifically, a rear portion of the front fork 6 relative to the front fender 28, i.e., a portion rearward of the front fork 6, is located lower than the front end 28fa of the front fender 28.

In other words, in a front view, a lower surface of a rear portion of the front fender 28 is exposed without being hidden by the front surface of the front fender 28. Thus, a part of incoming wind that has passed under the front end 28fa of the front fender 28 is guided and deflected by the lower surface of the rear portion of the front fender 28, so as to flow rearward. The lower surface of the rear portion of the front fender 28 is inclined downward as advancing rearward. Thus, the incoming wind guided by the front fender 28 flows while being deflected downward and rearward from the lower end 28ra of the front fender 28. The details of the front fender 28 will be described later.

A pair of right and left side covers 30 are provided at a front part of the motorcycle body. In the present embodiment, the side covers 30 are made from synthetic resin. Each side cover 30 includes a tank cover portion 31, and a shroud portion 32 located frontward of the tank cover portion 31. The tank cover portion 31 covers a lower end portion of the seat 26 and the fuel tank 24 from the laterally outer side, above the engine E. The shroud portion 32 covers a part of the motorcycle frame structure FR from the outer side in the vehicle widthwise direction, on the front side of the engine E. In the present embodiment, the tank cover portion 31 and the shroud portion 32 are integrally formed by a mold. However, the tank cover portion 31 and the shroud portion 32 may be formed separately from each other and then may be joined to each other.

The shroud portion 32 is formed substantially in a triangular shape in a side view, and the dimension thereof in a front-rear direction longitudinal direction of the motorcycle expands from the lower end toward the upper side. Specifically, of the shroud portion 32, a part from the lower end to the front edge is inclined frontward as advancing upward. In addition, of the shroud portion 32, a part from the lower end to the rear edge is inclined rearward as advancing upward. In the present embodiment, at a rear end portion of the shroud portion 32, a fixation portion to be fixed to a down frame member 1b described later is formed. Since the shroud portions 32 are formed, incoming wind passing on the inner side in the vehicle widthwise direction between the shroud portions 32 is prevented from deviating outward in the vehicle widthwise direction.

In the present embodiment, each shroud portion 32 covers the down frame member 1b described later from the outer side in the vehicle widthwise direction, in front of the cylinder head 20. The front edge of the shroud portion 32 is located frontward of the down frame member 1b. The rear edge of the shroud portion 32 is located rearward of the down frame member 1b. The shroud portion 32 is inclined inward in the vehicle widthwise direction as advancing rearward from the front end. In addition, the pair of right and left shroud portions 32 are located outward in the vehicle widthwise direction with respect to the front fender 28 so as to be spaced therefrom.

The lower end 28ra of the front fender 28 is located upward relative to a lower end 32a of the shroud portion 32, and is located rearward relative to a front edge portion 32b of the shroud portion 32. That is, as seen from the lateral side in the vehicle widthwise direction, the lower end 28ra of the front fender 28 overlaps the shroud portion 32, and is covered by the shroud portion 32 from the laterally outer side. More specifically, in a side view, the shroud portion 32 covers a virtual line VL connecting the lower end 28ra of the front fender 28 and an air introduction hole 42 described later, from the outer side in the vehicle widthwise direction.

The main frame 1 includes a pair of right and left main frame pieces 1a, 1a extending from an upper portion of the head pipe 4 obliquely downward in the rearward direction. Each main frame piece 1a extends from the upper side to the rear side of the engine E, and the swingarm bracket 12 is provided at the rear end of the main frame piece 1a. The swingarm bracket 12 extends approximately in the vertical direction at the rear of the engine E.

Figure 2:
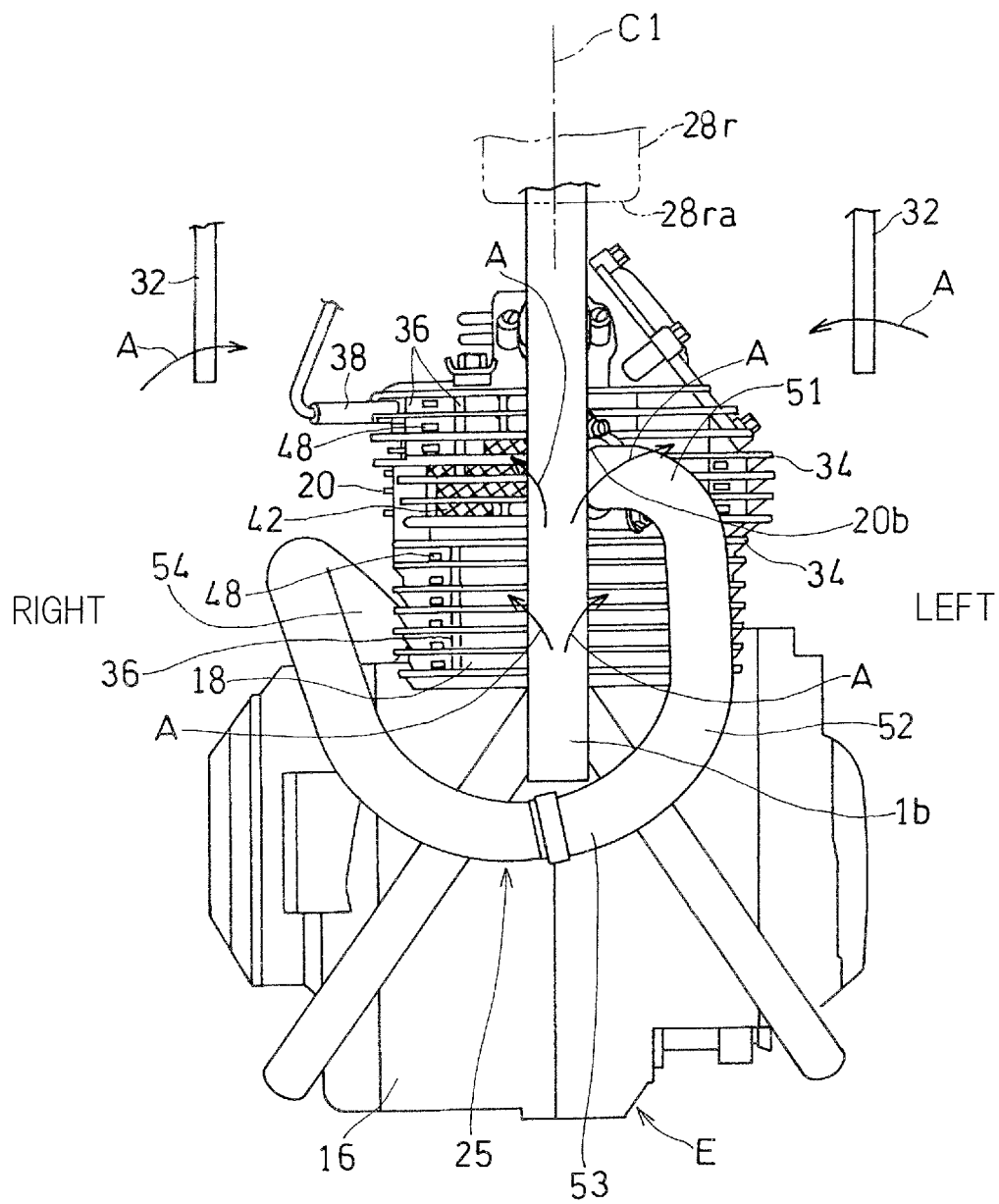
FIG. 2 is a front view showing an engine and a motorcycle frame structure of the motorcycle.

The main frame 1 further includes a down frame member 1b extending downward from a lower portion of the head pipe 4. As shown in FIG. 2, the down frame member 1b includes a single frame piece extending downward in front of the engine E and right and left pieces branched from the single frame piece. The two branched pieces extend rearward under the engine E so as to be connected to the lower ends of the right and left swingarm brackets 12, 12, respectively.

As shown in FIG. 2, a plurality of cooling fins 34 are formed on the cylinder 18 and the cylinder head 20. The cooling fins 34 are provided so as to increase the surface areas of the cylinder 18 and the cylinder head 20, thereby enhancing the cooling effect. Each cooling fin 34 is formed in a plate shape and extends in the direction perpendicular to the cylinder axis C1. The cooling fins 34 are arranged such that the thickness direction thereof is in parallel to the cylinder axis C1. The cooling fins 34 are arranged in the direction of the cylinder axis C1 so as to be spaced from each other. In detail, the cooling fins 34 are formed on both sides in the vehicle widthwise direction and on the front side, with respect to the cylinder. The cooling fins 34 adjacent to each other in the direction of the cylinder axis C1 are connected to each other by vertical walls 36 extending in the direction of the cylinder axis C1.

Figure 3:
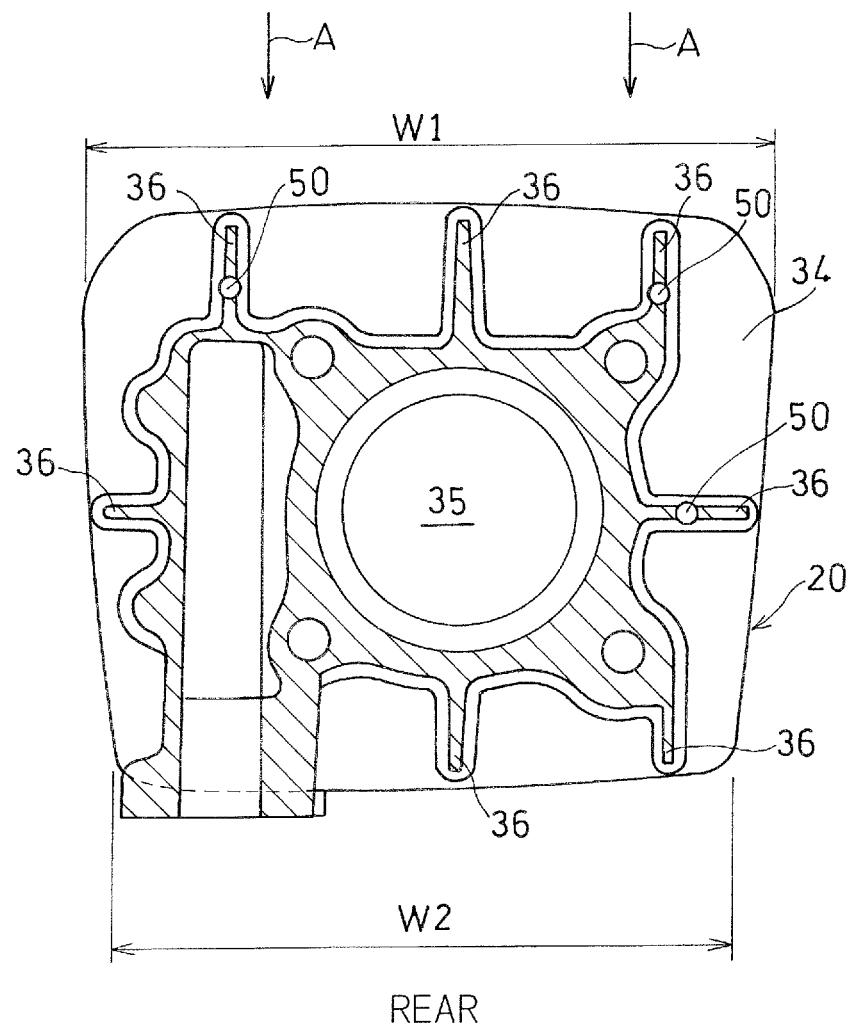
FIG. 3 is a sectional view along line in FIG. 1.

As shown in FIG. 3, the dimension in the vehicle widthwise direction of each cooling fin 34 gradually increases toward the front side. That is, the cooling fin 34 has a trapezoidal shape in which a dimension W1 in the vehicle widthwise direction of the front edge is greater than a dimension W2 in the vehicle widthwise direction of the rear edge. The front side of the cooling fin 34 is a part with which a large amount of incoming wind guided by the front fender 28 collides first. Therefore, receiving the incoming wind by the part having a wide area enhances the heat dissipation effect, thereby enhancing the cooling effect.

Figure 5:
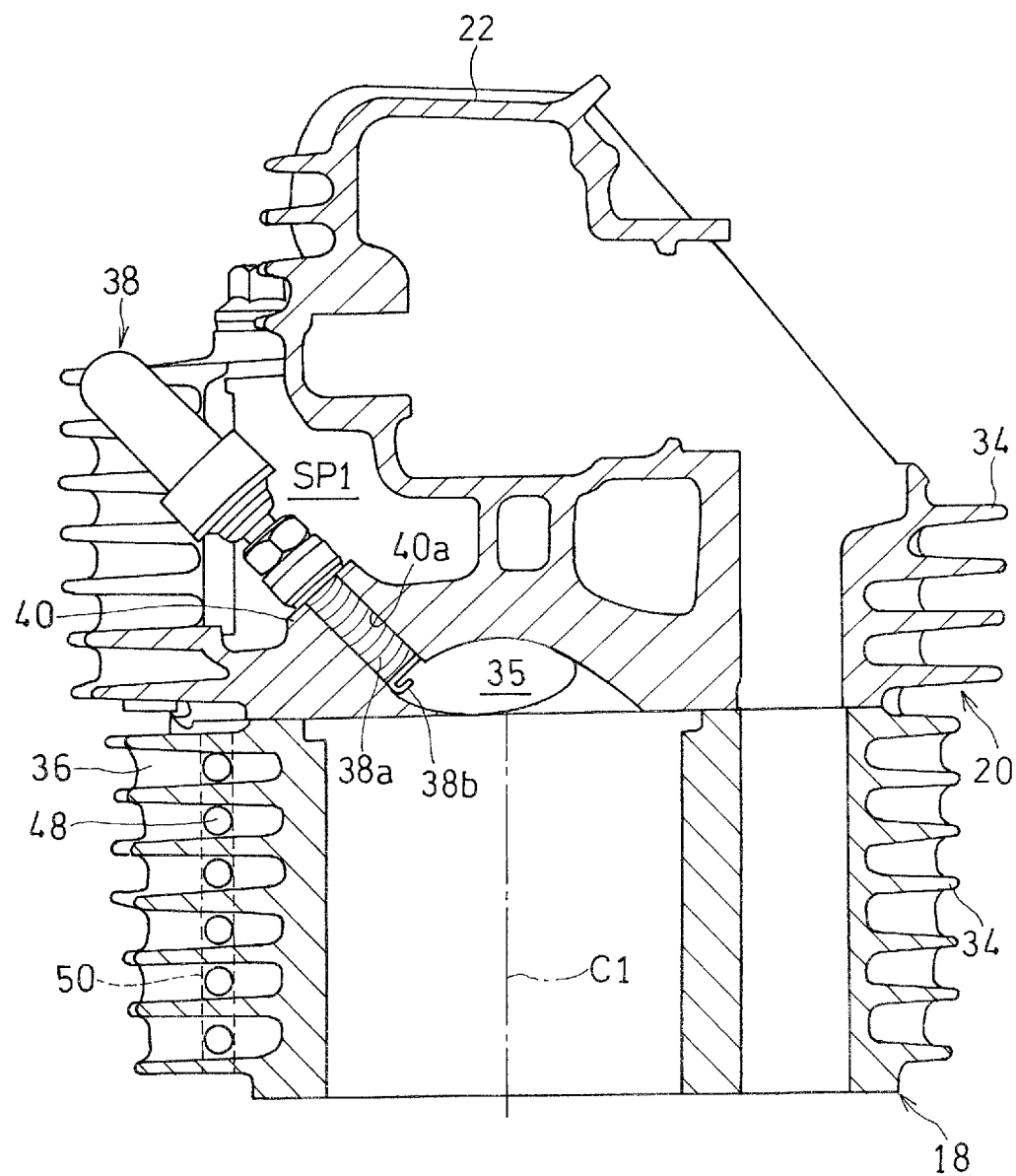
FIG. 5 is a vertical sectional view of a cylinder head of the engine.

As shown in FIG. 1, a spark plug 38 is attached to the right side portion (one side portion in the vehicle widthwise direction) of the cylinder head 20 so as to protrude from the engine body. The spark plug 38 performs spark ignition inside a combustion chamber 35. As shown in FIG. 5, the cylinder head 20 has a plug attachment portion 40 for attaching the spark plug 38. The plug attachment portion 40 is formed in a boss shape relative to the other part, and protrudes upward from the upper surface of the cylinder head 20. The boss-shaped plug attachment portion 40 has a female screw portion 40a defined therein.

The spark plug 38 has a male screw portion 38a on the outer circumference thereof, and has a spark generation portion 38b at an end of the male screw portion 38a. The male screw portion 38a of the spark plug 38 is screwed into the female screw portion 40a of the plug attachment portion 40, and the spark generation portion 38b faces the combustion chamber 35.

Figure 4:
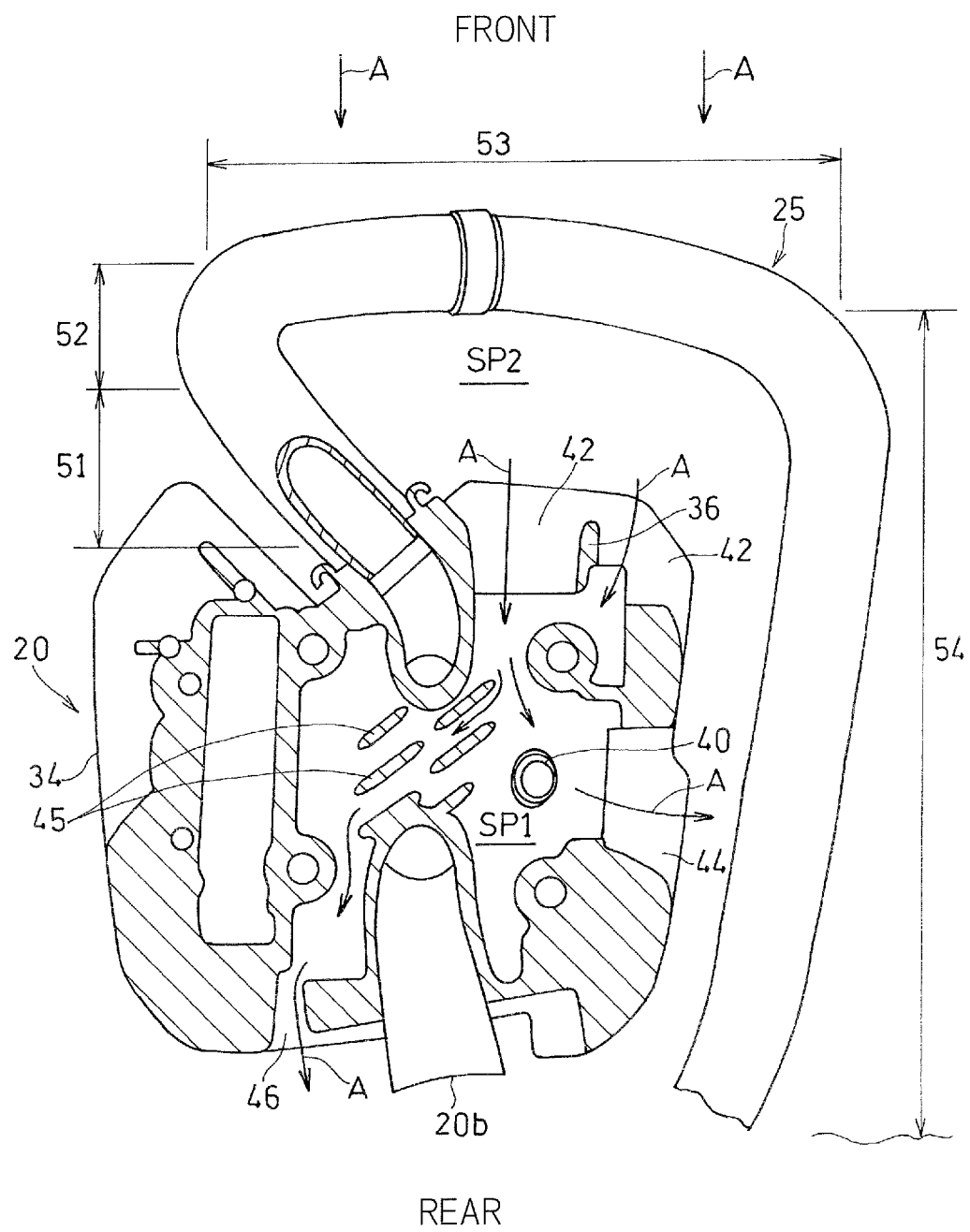
FIG. 4 is a sectional view along line IV-IV in FIG. 1.

As shown in FIG. 2, the cylinder head 20 has, at the front part thereof, the air introduction hole 42 which opens frontward. In FIG. 2, the air introduction hole 42 is shown by cross-hatching. In the present embodiment, the air introduction hole 42 is formed between the vertical walls 36, 36 arranged so as to be spaced from each other in the vehicle widthwise direction. As shown in FIG. 4, a plug vicinity space SP1, which is a space around the plug attachment portion 40, and a frontward space SP2, which is a space frontward of the cylinder head 20, communicate with each other through the air introduction hole 42, whereby incoming wind A is guided from the air introduction hole 42 to the plug vicinity space SP1.

In the present embodiment, as shown in FIG. 2, a part of the air introduction hole 42 is formed in an area shifted to one lateral side (right lateral side) in the vehicle widthwise direction relative to the down frame member 1b (motorcycle frame structure FR) located in front of the cylinder head 20.

As shown in FIG. 4, the cylinder head 20 has a rear outlet 46 and a lateral outlet 44 communicating with the plug vicinity space SP1. The lateral outlet 44 opens toward one lateral side (right lateral side) in the vehicle widthwise direction from the plug vicinity space SP1. The rear outlet 46 is located so as to be shifted to the other side (left side) in the vehicle widthwise direction from the plug vicinity space SP1, and opens rearward.

In the cylinder head 20, vertical fins 45 for cooling are formed between the plug vicinity space SP1 and the rear outlet 46. Each vertical fin 45 is formed in a plate shape and extends in the direction of the cylinder axis C1. The vertical fins 45 are formed above the combustion chamber 35. The vertical fins 45 are provided in a space in the vehicle widthwise direction between the plug vicinity space SP1 and the rear outlet 46 so as to be arranged in series from the plug vicinity space SP1 to the rear outlet 46. The vertical fins 45 are inclined in the vehicle widthwise direction so as to approach the rear outlet 46 as advancing rearward from the front end. Thus, the cooling effect by incoming wind colliding with the vertical fins 45 can be enhanced, and also, the incoming wind can be readily guided to the rear outlet 46.

A plurality of the vertical fins 45 are arranged in the longitudinal direction of the motorcycle, and a plurality of the vertical fins 45 are arranged in the flowing direction of incoming wind. In the present embodiment, a plurality of the vertical fins 45 are arranged in the longitudinal direction of the motorcycle and in the vehicle widthwise direction. The vertical fins 45 arranged in the flowing direction of incoming wind are located so as to be spaced from each other in the flowing direction. Each vertical fin 45 located downstream in the flowing direction is located so as to be shifted in the longitudinal direction of the motorcycle. In other words, the vertical fin 45 located downstream in the flowing direction is located at a position corresponding to a position within a pitch between the two vertical fins 45 located upstream in the flowing direction. Thus, incoming wind guided to the vertical fins 45 on the upstream side in the flowing direction readily collides with the vertical fins 45 on the downstream side in the flowing direction, whereby heat exchange between the incoming wind and the vertical fins 45 is promoted.

As shown in FIG. 2, auxiliary air introduction holes 48 which open frontward are formed in the vertical walls 36. The auxiliary air introduction holes 48 are formed at positions different from the air introduction hole 42, and are located between the cooling fins 34 arranged in the vertical direction. That is, the auxiliary air introduction holes 48 are also arranged in the vertical direction. Each auxiliary air introduction hole 48 penetrates the vertical wall 36 in the longitudinal direction of the motorcycle. As shown in FIG. 5, the auxiliary air introduction holes 48 adjacent to each other in the vertical direction communicate with each other through a vertical hole 50 formed in the vertical wall 36. The vertical hole 50 extends approximately in the vertical direction along the cylinder axis C1 and penetrates the vertical wall 36 in the vertical direction.

As shown in FIG. 2, the exhaust pipe 25 is located at a position adjacent to the outer side in the vehicle widthwise direction of the air introduction hole 42. The exhaust pipe 25 extends frontward from the exhaust port 20b defined at the front surface of the cylinder head 20 while separating in the vehicle widthwise direction from the air introduction hole 42, specifically, separating toward the other lateral side (left lateral side) in the vehicle widthwise direction, and then bends and extends downward, and further, extends toward the one lateral side (right lateral side) in the vehicle widthwise direction, below the cylinder 20. Further, the exhaust pipe 25 bends upward, and then bends rearward on the one lateral side (right lateral side) in the vehicle widthwise direction of the cylinder 18, so as to extend rearward on the right lateral side of the cylinder 18.

In other words, the exhaust pipe 25 includes: a first part 51 extending from the front surface of the cylinder head 20 in the frontward direction toward the other lateral side (left lateral side) in the vehicle widthwise direction; a second part 52 extending downward from the downstream end of the first part 51 to a position below the cylinder 18; a third part 53 extending in the vehicle widthwise direction from the lower end of the second part 52 to the one lateral side (right lateral side) in the vehicle widthwise direction of the cylinder 18; and a fourth part 54 extending rearward from the downstream end of the third part 53 on the one lateral side (right lateral side) in the vehicle widthwise direction of the cylinder 18. In the present embodiment, the third part 53 of the exhaust pipe 25 bends and extends downward toward the right lateral side, and then, from the middle part in the vehicle widthwise direction, extends toward the right lateral side while bending upward.

As described above, the exhaust pipe 25 in the present embodiment extends while bending in the vehicle widthwise direction and the vertical direction without the second part 52 overlapping the cylinder head 20 and the cylinder 18 in a front view. Thus, the second part 52 of the exhaust pipe 25 is prevented from blocking incoming wind flowing toward the cooling fins 34. In addition, a sufficient exhaust pipe length is ensured for the exhaust pipe 25, and thus, the exhaust efficiency can be maintained at a high level.

At a rear portion 28r of the front fender 28 shown in FIG. 1, a guide portion 56 for guiding incoming wind A toward the air introduction hole 42 is formed. In detail, the front fender 28 includes a fender front portion 28f, a fender intermediate portion 28i, and a fender rear portion 28r. The fender intermediate portion 28i is located frontward of the fender rear portion 28r, and connects the fender front portion 28f and the fender rear portion 28r. In the present embodiment, the fender intermediate portion 28i includes a part defined therein between the right and left front forks 6 and a part in the vicinity of such a part. The part frontward of the fender intermediate portion 28*i* forms the fender front portion 28*f*, and the part rearward of the fender intermediate portion 28*i* forms the fender rear portion 28*r*.

The front end 28*fa* of the front fender 28 is located frontward with respect to an axis AX of the front wheel 8. More specifically, the front end 28*fa* of the front fender 28 is located frontward with respect to a front edge of a brake disc 57 to be grasped and pressed by a brake caliper 55 of the front wheel 8.

Figure 6:
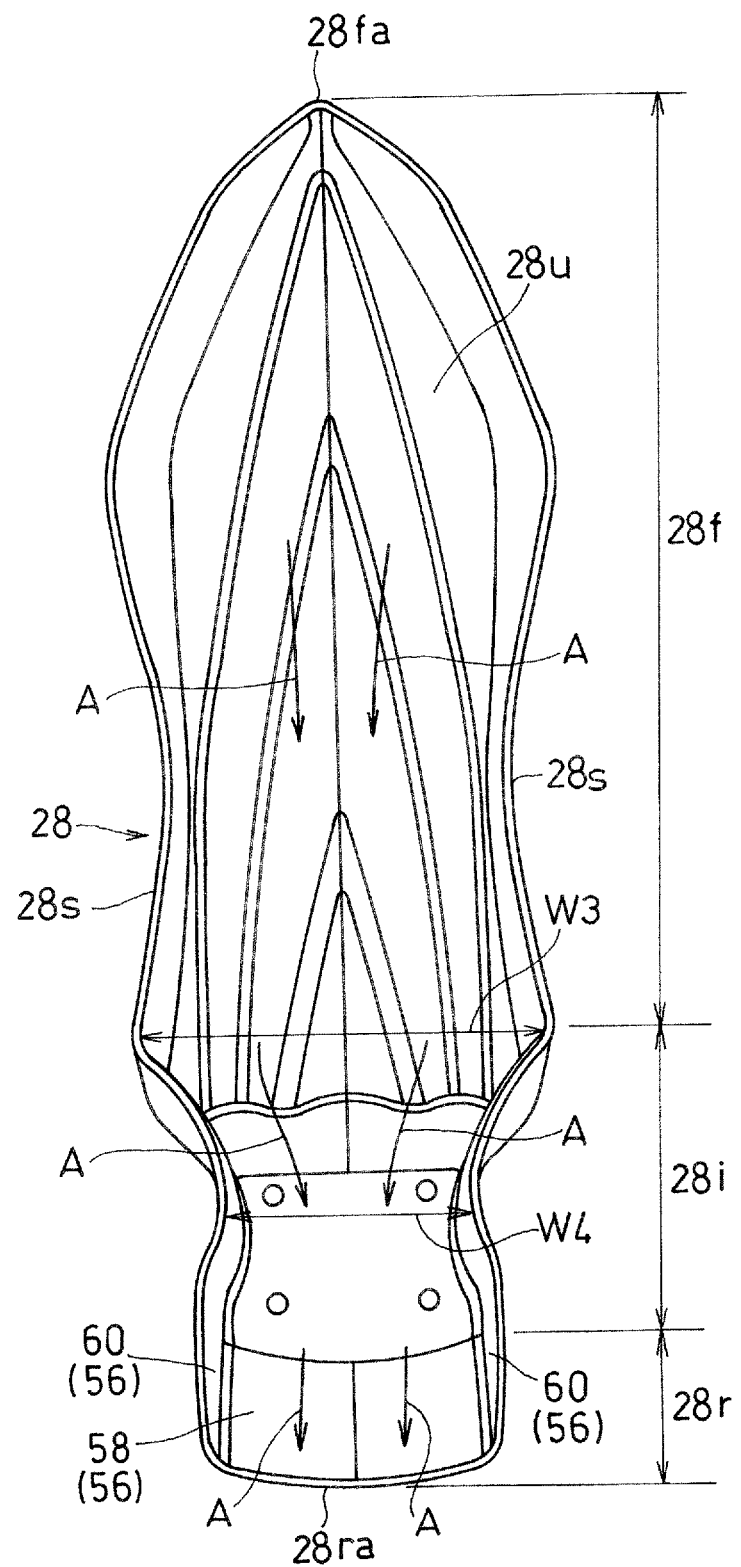
FIG. 6 is a bottom view showing a front fender of the motorcycle.

FIG. 6 is a bottom view of the front fender 28. As shown in FIG. 6, the dimension in the vehicle widthwise direction of the fender front portion 28*f* is greater than those of the fender intermediate portion 28*i* and the fender rear portion 28*r*.

Figure 7:
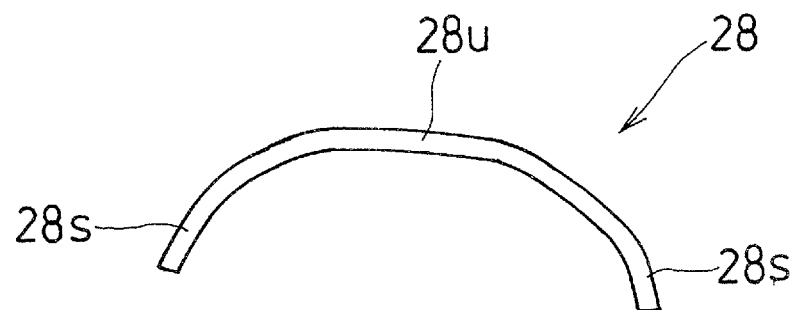
FIG. 7 is a sectional view showing the front fender.

The dimension in the vehicle widthwise direction of the fender intermediate portion 28*i* gradually decreases from the front end toward the rear side. As shown in FIG. 7, the front fender 28 has, in its entirety, a cup-shaped cross section that is formed by an upper wall 28*u* and right and left side walls 28*s* and opens downward, whereby incoming wind A is guided rearward without escaping to the lateral side. Thus, as shown in FIG. 6, incoming wind A entering the inside (underside) of the front fender 28 is constricted by the fender intermediate portion 28*i*, so that the flowing speed thereof increases, whereby the incoming wind A can be effectively guided.

A dimension ratio (W3/W4) between a dimension W3 in the vehicle widthwise direction of the front end of the fender intermediate portion 28*i* and a dimension W4 in the vehicle widthwise direction of the narrowest-width part thereof, is 1.3 to 2.0, for example. If the dimension ratio (W3/W4) is smaller than 1.3, i.e., the difference between the front end part dimension W3 and the narrow-width part dimension W4 is too small, the effect of increasing the flowing speed of incoming wind cannot be obtained sufficiently. On the other hand, if the dimension ratio (W3/W4) is greater than 2.0, i.e., the difference between the front end part dimension W3 and the narrow-width part dimension W4 is too great, the fender front portion 28*f* has a great width, leading to increase in weight. Here, the front end part dimension W3 and the narrow-width part dimension W4 are the inner surface width dimensions of the front fender 28.

As shown in FIG. 1, the fender rear portion 28*r* is short in length in the longitudinal direction of the motorcycle, and is inclined downward in the rearward direction. The fender rear portion 28*r* is inclined so that incoming wind A is guided toward the air introduction hole 42. In the present embodiment, the lower end 28*ra* of the fender rear portion 28*r* is located upward relative to the air introduction hole 42. In addition, in the present embodiment, as described above, the lower end 28*ra* of the front fender 28 is located upward relative to the upper end of the cylinder head cover 22. The lower end 28*ra* (rear end) of the front fender 28 is located so as to ensure a clearance between the lower end 28*ra* and the down frame member 1*b* even when the front fender 28 turns right or left or vibrates in the vertical direction during traveling.

The inclination angle of the fender rear portion 28*r* is set so that incoming wind A guided by the guide portion 56 flows toward the air introduction hole 42. Thus, incoming wind can be guided to the plug attachment portion 40 which can have a relatively high temperature in the cylinder head 20, whereby the cooling efficiency for the entire cylinder head 20 can be enhanced.

The guide portion 56 is formed at the lower surface (inner surface) of the fender rear portion 28*r*. As shown in FIG. 6, the guide portion 56 includes: a deflection surface 58 which receives incoming wind flowing from the front side and deflects the incoming wind downward; and side wall surfaces 60, 60 formed on both right and left sides of the deflection surface 58 and extending downward from the deflection surface 58. Owing to the side wall surfaces 60, 60, incoming wind A flowing rearward along the deflection surface 58 is prevented from deviating outward in the vehicle widthwise direction. Therefore, the incoming wind A guided by the deflection surface 58 can be effectively guided to the cooling fins 34 and the air introduction hole 42. Thus, the cooling effect for the engine E is improved.

As shown in FIG. 1, a virtual extension surface VS extended downward along the deflection surface 58 passes through an area in front of the cylinder head 20. The incoming wind A flowing along the virtual extension surface VS collides with the incoming wind A in the area in front of the cylinder head 20, whereby the amount of incoming wind flowing toward the front surface of the cylinder head 20 can be increased. Thus, the cooling effect for the engine E can be further enhanced.

Operation of the wind guiding structure in the present embodiment will be described. When the motorcycle travels, incoming wind A passing between the front wheel 8 and the front fender 28 is guided toward the front surface of the engine E by the guide portion 56 of the front fender 28. The incoming wind A is branched to the right and the left by the down frame member 1*b*, and flows rearward along the cooling fins 34. Thus, the cylinder 18 and the cylinder head 20 are cooled.

A part of the incoming wind A is introduced to the inside of the cylinder head 20 through the air introduction hole 42. As shown in FIG. 4, the incoming wind A introduced to the inside of the cylinder head 20 through the air introduction hole 42 passes through the plug vicinity space SP1. Since the plug attachment portion 40 protrudes upward in the plug vicinity space SP1, the incoming wind A readily collides with the plug attachment portion 40. Thus, the vicinity of the plug attachment portion 40, the temperature of which is apt to be increased, can be effectively cooled.

Another part of the incoming wind A is introduced into the auxiliary air introduction holes 48 shown in FIG. 2. As shown in FIG. 5, each auxiliary air introduction hole 48 penetrates the vertical wall 36 in the longitudinal direction of the motorcycle, and the adjacent auxiliary air introduction holes 48 communicate with each other through the vertical hole 50. Therefore, the incoming wind A introduced into the auxiliary air introduction hole 48 flows between the cooling fin 34 and the cooling fin 34, in the longitudinal direction of the motorcycle and the vertical direction. Thus, the cooling effect for the engine E is enhanced.

In the above configuration, the incoming wind A is guided toward the air introduction hole 42 by the fender rear portion 28*r* of the front fender 28 shown in FIG. 1. Thus, the vicinity of the plug attachment portion 40, the temperature of which is apt to be increased, can be effectively cooled. Therefore, the incoming wind A is smoothly introduced through the air introduction hole 42 to the area around the plug attachment portion 40 of the spark plug 38, whereby the cooling effect for the cylinder head 20 can be enhanced. As a result of increase in the cooling effect, the engine output can be increased. In addition, this structure is obtained merely by forming the air introduction hole 42 in the cylinder head 20 and providing the guide portion 56 to the fender rear portion 28*r*, and therefore, the number of components does not increase.

As shown in FIG. 4, the incoming wind A introduced to the inside of the cylinder head 20 through the air introduction hole 42 cools the plug attachment portion 40, and thereafter, is discharged to outside through the lateral outlet 44, which opens toward the lateral side in the vehicle widthwise direction, and the rear outlet 46 which opens rearward. Thus, the incoming wind A introduced into the space SP1 around the plug attachment portion 40 is readily discharged, and the incoming wind A flows smoothly. As a result, the cooling effect for the cylinder head 20 can be enhanced.

The lower end 28ra of the fender rear portion 28r of the front fender 28 shown in FIG. 1 is located upward relative to the lower end of the cylinder head cover 22. In the front view shown in FIG. 2, the fender rear portion 28r and the cylinder head 20 do not overlap each other, and therefore, the front fender 28 is prevented from blocking the incoming wind flowing toward the cylinder head 20. In addition, by the incoming wind A guided by the guide portion 56 shown in FIG. 1, the incoming wind A flowing in the longitudinal direction of the motorcycle between the lower end 28ra of the fender rear portion 28r and the lower end of the cylinder head cover 22 can be also caused to flow toward the front surface of the cylinder head 20. As a result, the amount of incoming wind flowing toward the cylinder head 20 increases, whereby the cooling effect for the cylinder head 20 can be enhanced.

As shown in FIG. 6, the dimension in the vehicle widthwise direction of the fender front portion 28f is greater than that of the fender rear portion 28r, and the dimension in the vehicle widthwise direction of the fender intermediate portion 28i gradually decreases from the front end toward the rear side. The fender front portion 28f having a great width can collect a great amount of incoming wind A. In addition, since the front end 28fa of the fender front portion 28f extends to a position frontward relative to the brake disc 57, a further great amount of incoming wind A can be collected.

In addition, the fender intermediate portion 28i of which the dimension in the vehicle widthwise direction gradually decreases toward the rear side can increase the flowing speed of the incoming wind A collected by the fender front portion 28f. Further, the incoming wind A having the increased flowing speed is guided to the front surface of the cylinder head 20 by the fender rear portion 28r inclined toward the air introduction hole 42. Thus, the cooling effect for the cylinder head 20 can be enhanced.

As shown in FIG. 1, the lower end 28ra of the fender rear portion 28r is located upward relative to the lower end 32a of the shroud portion 32, and is located rearward relative to the front edge portion 32b of the shroud portion 32. By the shroud portion 32, the incoming wind A guided by the front fender 28 is prevented from deviating outward in the vehicle widthwise direction. Therefore, as shown in FIG. 2, the incoming wind A readily flows toward the cylinder head 20, and the cooling effect for the cylinder head 20 can be enhanced.

The exhaust pipe 25 connected to the front surface of the cylinder head 20 extends frontward from the front surface of the cylinder head 20 toward the side (left side), in the vehicle widthwise direction, opposite to the air introduction hole 42. Therefore, flow of incoming wind A toward the air introduction hole 42 is prevented from being blocked by the exhaust pipe 25. Thus, the cooling effect for the cylinder head 20 can be enhanced.

Further, the exhaust pipe 25 extends to a position below the lower end of the cylinder 18, extends rightward below the cylinder 18, and then bends upward and extends rearward on the right lateral side of the cylinder 18. Thus, while a sufficient exhaust pipe length is ensured and the exhaust effect is maintained at a high level, the exhaust pipe 25 is prevented from blocking the incoming wind A, whereby the cooling effect for the cylinder 18 and the cylinder head 20 can be enhanced.

A part of the air introduction hole 42 shown in FIG. 2 is formed in an area shifted in the vehicle widthwise direction relative to the down frame member 1b located in front of the cylinder head 20. Therefore, incoming wind A colliding with the down frame member 1b and deviating in the vehicle widthwise direction readily flows toward the air introduction hole 42. Thus, the cooling effect for the cylinder head 20 can be enhanced.

The present invention is not limited to the above embodiments, and numerous additions, modifications, and omissions can be made without departing from the gist of the present invention. For example, in the above embodiments, the down frame member 1b is provided in front of the engine E. However, the down frame member 1b may not be provided. In the above embodiments, the side cover 30 is provided in front of the engine E. However, the side cover 30 may not be provided. Thus, such additions, modifications, and omissions are to be construed as included in the scope of the present invention.

REFERENCE NUMERALS

1 • • • main frame (motorcycle frame structure)
1b • • • down frame member (motorcycle frame structure)
18 • • • cylinder
20 • • • cylinder head
22 • • • cylinder head cover
28 • • • front fender
28f • • • fender front portion
28i • • • fender intermediate portion
28r • • • fender rear portion
30 • • • shroud
38 • • • spark plug
42 • • • air introduction hole
44 • • • lateral outlet
46 • • • rear outlet
51 • • • first part
56 • • • guide portion
A • • • incoming wind
E • • • air-cooled engine
SP1 • • • plug vicinity space (space around attachment portion)
SP2 • • • frontward space

What is claimed is:

1. An engine cooling structure for a motorcycle including an air-cooled engine, which is a drive source, and a front fender provided in front of the air-cooled engine, wherein
a cylinder head of the air-cooled engine includes a plurality of cooling fins, the cooling fins being connected to each other by vertical walls extending in a direction of a cylinder axis,
an air introduction hole is formed at a front part of the cylinder head of the air-cooled engine such that the air introduction hole opens frontward and a space around an attachment portion for a spark plug and a space in front of the cylinder head communicate with each other through the air introduction hole,
a guide portion is formed at the front fender and configured to guide incoming wind toward the air introduction hole, the air introduction hole is disposed at a front surface of the cylinder head, which opens frontward, and is a through-hole which is formed between the vertical walls, a plug vicinity space, which is a space inside the cylinder head, and a frontward space, which is a space outside of the cylinder head, communicate with each other through the air introduction hole, and the incoming wind is introduced to the inside of the cylinder head through the air introduction hole, and passes through the plug vicinity space so as to collide with the attachment portion for the spark plug, which protrudes upward in the plug vicinity space.

2. The engine cooling structure as claimed in claim 1, wherein
a lower end of a rear portion of the front fender is located upward relative to a lower end of a cylinder head cover of the air-cooled engine.

3. The engine cooling structure as claimed in claim 1, wherein
the front fender includes a fender front portion, a fender rear portion, and a fender intermediate portion located frontward of the fender rear portion and connecting the fender front portion and the fender rear portion,
a dimension in a vehicle widthwise direction of the fender front portion is greater than that of the fender rear portion, and
a dimension in a vehicle widthwise direction of the fender intermediate portion gradually decreases from a front end thereof toward a rear side.

4. The engine cooling structure as claimed in claim 1, comprising:
a shroud provided so as to be located frontward relative to the cylinder head, the shroud covering a part of a motorcycle frame structure from an outer side in a vehicle widthwise direction, wherein
a lower end of a rear portion of the front fender is located rearward relative to a front edge portion of the shroud.

5. The engine cooling structure as claimed in claim 1, wherein
an exhaust pipe is connected to a front surface of the cylinder head, and
the exhaust pipe includes a first part extending so as to be separated in a vehicle widthwise direction from the air introduction hole as advancing frontward from the front surface of the cylinder head.

6. The engine cooling structure as claimed in claim 5, wherein
the exhaust pipe extends downward from the first part, and then, at a position below a lower end of a cylinder, bends upward, to extend rearward on one lateral side, with respect to the vehicle widthwise direction, of the cylinder.

7. The engine cooling structure as claimed in claim 1, wherein
the cylinder head has a lateral outlet which opens toward a lateral side in a vehicle widthwise direction from the space around the attachment portion for the spark plug, and a rear outlet which opens rearward from the space around the attachment portion for the spark plug.

8. The engine cooling structure as claimed in claim 1, wherein
at least a part of the air introduction hole is formed in an area shifted one lateral side in a vehicle widthwise direction with respect to a motorcycle frame structure provided in front of the cylinder head.

9. An engine cooling structure for a motorcycle including an air-cooled engine, which is a drive source, and a front fender provided in front of the air-cooled engine, wherein
a cylinder head of the air-cooled engine includes a plurality of cooling fins, the cooling fins being connected to each other by vertical walls extending in a direction of a cylinder axis,
an air introduction hole is formed at a front part of the cylinder head of the air-cooled engine such that the air introduction hole opens frontward and a space around an attachment portion for a spark plug and a space in front of the cylinder head communicate with each other through the air introduction hole,
a guide portion is formed at the front fender and configured to guide incoming wind toward the air introduction hole,
the air introduction hole is disposed at a front surface of the cylinder head, which opens frontward, and is a through-hole which is formed between the vertical walls,
a plug vicinity space, which is a space inside the cylinder head, and a frontward space, which is a space outside of the cylinder head, communicate with each other through the air introduction hole, and
the air introduction hole is disposed at the front part of the cylinder head on the same side of the spark plug, with respect to a vehicle widthwise direction.

\* \* \* \* \*